United States Patent [19]
Friton et al.

[11] Patent Number: 5,375,335
[45] Date of Patent: Dec. 27, 1994

[54] BATTERY MANAGEMENT FOR VEHICLE ALIGNMENT SENSOR

[75] Inventors: Gerald E. Friton, Webster Groves; Michael T. Stieff, Wentzville, both of Mo.

[73] Assignee: Hunter Engineering Company, Bridgeton, Mo.

[21] Appl. No.: 122,376

[22] Filed: Sep. 16, 1993

[51] Int. Cl.$^5$ .............................................. G01B 21/26
[52] U.S. Cl. .................... 33/203.18; 33/203; 320/48
[58] Field of Search ............ 33/203.18, 203.19, 203.15, 33/203.16, 203.17, 203.2, 203; 320/48

[56] References Cited

U.S. PATENT DOCUMENTS

| | | | |
|---|---|---|---|
| 4,012,681 | 3/1977 | Finger et al. | 320/14 |
| 4,017,724 | 4/1977 | Finger | 235/151.31 |
| 4,193,026 | 3/1980 | Finger et al. | 324/428 |
| 4,236,315 | 12/1980 | Curchod et al. | 33/203.18 |
| 4,388,618 | 6/1983 | Finger | 340/636 |
| 4,560,937 | 12/1985 | Finger | 324/433 |
| 4,740,754 | 4/1988 | Finger | 324/428 |
| 5,056,233 | 10/1991 | Hechel et al. | 33/203 |
| 5,130,659 | 7/1992 | Sloan | 320/48 |
| 5,155,428 | 10/1992 | Kang | 320/48 |

FOREIGN PATENT DOCUMENTS

WO8809913 12/1988 WIPO ................. 33/203.18

Primary Examiner—William A. Cuchlinski, Jr.
Assistant Examiner—G. Bradley Bennett
Attorney, Agent, or Firm—Polster, Lieder, Woodruff & Lucchesi

[57] ABSTRACT

A vehicle wheel alignment system includes a battery powered wheel alignment sensor assembly and a a storage station for the sensor assembly. The storage station is designed to hold the sensor assembly by the wheel adapter in a predetermined position with respect to the storage station. It also includes a power source for charging the sensor assembly battery. An interlock arrangement automatically interconnects the sensor assembly battery and the power source to charge the sensor assembly battery when the sensor assembly is disposed in the predetermined position. A display is operatively connected to the wheel alignment sensor assembly for displaying measured alignment information. A battery level measuring circuit measures the state of discharge of the sensor assembly battery by examining the battery voltage and generates a signal proportional to the measured battery voltage. The display is controlled to also display an analog representation thereon indicative of the level of discharge of the sensor assembly battery.

27 Claims, 5 Drawing Sheets

BATTERY MANAGEMENT FOR VEHICLE ALIGNMENT SENSOR

BACKGROUND OF THE INVENTION

This invention relates to vehicle alignment apparatus, and more particularly to such apparatus utilizing battery powered sensors.

Apparatus for aligning vehicle wheels typically use sensors mounted at each wheel and a central console (or a handheld remote unit) which receives and manipulates data from the sensors. Communication between the sensors and the console (or remote unit) is conventionally accomplished over electrical cables. In those systems, the cables also provide power for the sensors. Cables, however, do have certain drawbacks. They tend to get in the way, they must be physically installed by the user, and their length is fixed (requiring consistent placement of the vehicle).

Cableless alignment systems have been designed, but they require some means of providing power for the sensors at each wheel. Batteries are used to provide this power, but batteries come with their own drawbacks. For example, although batteries can be recharged, it is inconvenient for a user of alignment equipment to stop an alignment procedure in mid-procedure to recharge or replace a battery. The technician often is not aware until too late that the battery needs to be recharged. Moreover, although the discharge state of a battery can be measured, that measurement is generally analog, while communications between the sensors and the console in cableless systems is almost exclusively digital.

With conventional battery-powered sensor alignment systems, the act of (re)charging the batteries requires the technician/user to perform a separate operation (which may involve throwing a switch, or may be more complicated), and the technician/user does not always remember to perform that operation at the proper time. Rechargeable batteries also require special handling to promote battery life. Deep discharge can shorten battery life, as can recharging using relatively simple recharging schemes.

SUMMARY OF THE INVENTION

Among the various objects and features of the present invention may be noted the provision of an improved vehicle alignment system with battery powered sensors.

Another object is the provision of such a system which provides a readily observable indication of remaining battery charge.

A third object is the provision of such a system which provides a digital signal indicative of battery state.

A fourth object is the provision of such a system which automatically recharges the sensor batteries when the sensors are not being used.

A fifth object is the provision of such a system which provides adequate warning before the sensor batteries undergo deep discharge.

A sixth object is the provision of such a system with an improved recharging circuit which promotes battery life.

Other objects and features will be in part apparent and in part pointed out hereinafter.

Briefly, in a first aspect of the present invention, a vehicle wheel alignment system includes a wheel alignment sensor assembly adapted to be removably secured to a vehicle wheel to measure alignment angles thereof. The sensor assembly includes a battery to provide power during measurement of the alignment angles. It also includes a sensor housing and an adapter for attaching the sensor assembly to a variety of vehicle wheels, the sensor housing being removably secured to the adapter. A storage station for the sensor assembly includes structure for holding the sensor assembly in a predetermined position with respect to the storage station. It also includes a power source for charging the sensor assembly battery. The structure for holding the sensor assembly in a predetermined position includes structure disposed on the storage station for accepting and holding in place the sensor assembly adapter while the sensor housing is secured to the adapter. The battery and the power source are automatically interconnected to charge the sensor assembly battery when the sensor assembly is placed in the predetermined position.

In a second aspect of the present invention, a vehicle wheel alignment system includes a wheel alignment sensor assembly adapted to be removably secured to a vehicle wheel to measure alignment angles thereof. The sensor assembly includes a battery to provide power during measurement of the alignment angles. A storage station for the sensor assembly includes structure for holding the sensor assembly in a predetermined position with respect to the storage station by accepting and holding in place the removal wheel adapter. It also includes a power source with at least a pair of terminals for charging the sensor assembly battery. An interlock prevents the application of power to the power source terminals until the sensor assembly is disposed in the predetermined position.

In a third aspect of the present invention, a vehicle wheel alignment system includes a wheel alignment sensor assembly adapted to be removably secured to a vehicle wheel to measure alignment angles thereof. The sensor assembly includes a battery to provide power during measurement of the alignment angles. A display is operatively connected to the wheel alignment sensor assembly for displaying measured alignment information. A battery level measuring circuit measures the level of discharge of the sensor assembly battery and generates a signal proportional to the measured battery level. The display is controlled to display indicia thereon indicative of the level of discharge of the sensor assembly battery.

In a fourth aspect of the present invention, a vehicle wheel alignment system includes a wheel alignment sensor assembly adapted to be removably secured to a vehicle wheel to measure alignment angles thereof. The sensor assembly includes a battery to provide power during measurement of the alignment angles. A battery level measuring circuit measures the level of discharge of the sensor assembly battery and provides a signal proportional to the measured battery level.

BRIEF DESCRIPTION OF THE DRAWINGS

Similar reference characters indicate similar parts throughout the several views of the drawings.

DESCRIPTION OF THE PREFERRED EMBODIMENT

Figure 1:
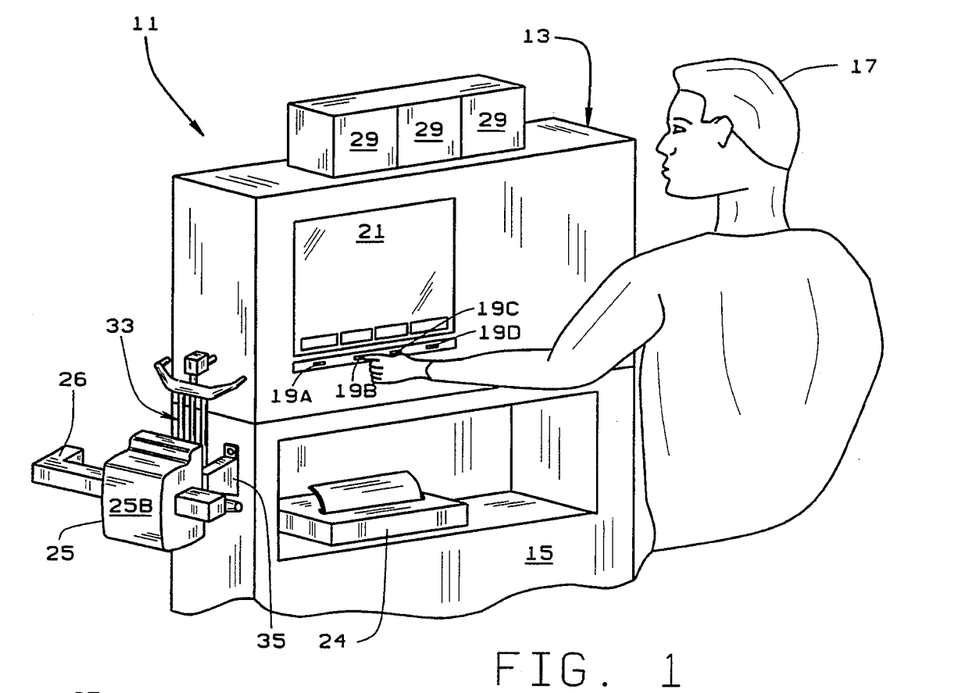
FIG. 1 is a perspective view of a vehicle alignment system console (with a technician/user) of the present invention.
Figure 2:
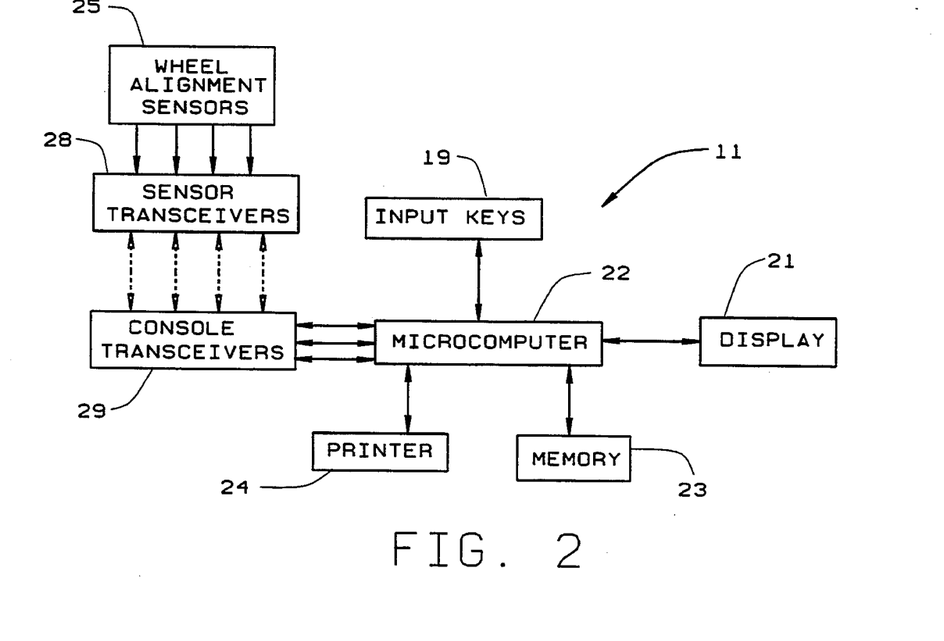
FIG. 2 is a block diagram of the circuitry of the system of FIG. 1.

Turning to the drawings, and more particularly to FIGS. 1 and 2, there is shown a vehicle wheel alignment system 11 of the present invention. Alignment system 11 includes a console 13, having a console base 15, for use by a technician/user 17. Console 13 includes a set of manually operable input keys or switches 19(A-D) and a display 21.

Input keys 19 and display 21 are connected to a microcomputer 22 which functions as an electronic controller to control the operation of system 11. Any number of different microcomputers may be used in system 11, depending upon the other requirements of the system. Microcomputer 22 is shown in FIG. 2 connected to input keys 19, display 21, a digital memory 23, and a printer 24. It should be understood that memory 23 could be internal to microcomputer 22, depending upon the particular microcomputer used. In addition, other peripheral devices (not shown) could be connected to microcomputer 22 as desired.

A plurality of wheel alignment sensor assemblies 25 are operatively connected during the alignment procedure to microcomputer 22 for supplying alignment information to the microcomputer. The use of sensors (such as the sensors 25A shown in block form in FIG. 6 below) to measure alignment characteristics is, of course, well known. See, U.S. Pat. Nos. Re33,144 to Hunter et al., 4,381,548 to Grossman et al., and 4,879,670 to Colarelli, the disclosures of which are incorporated herein by reference. The sensor assembly 25 shown in FIG. 1 includes a toe sensor arm 26. It will be appreciated that the present invention is not limited to that particular type of sensor assembly.

It is preferred that sensor assemblies 25 be battery powered. Communication between sensor assemblies 25 and microcomputer 22 is accomplished by a plurality of sensor transceivers 28 disposed at the sensor assemblies and a plurality of console transceivers 29 disposed at the console. The exact type of communications system is not a part of the present invention, other than that the communications is preferably in digital form.

Each wheel alignment sensor assembly 25 preferably includes its own microcomputer 31 (see FIG. 6) which acquires the wheel alignment information from alignment sensors 25A and sends that information by means of the communication channel, such as that provided by transceivers 28 and 29, to system microcomputer 22.

Assembly 25 includes an adapter 33 to permit the assembly to be removably secured to a vehicle wheel to measure alignment angles. Such adapters are well known in the art. Typically the sensor housing, labelled 25B in FIG. 1, is removably secured to the adapter 33, although the adapter and sensor housing in the present invention are preferably stored as one unit in the present invention. Specifically, sensor assembly 25 is stored at console 13 when not in use at a storage station formed by a bracket 35 and console 13. The bracket is shown secured to base 15, although it will be appreciated that the particular placement and number of brackets is a matter of choice and depends upon the number of sensor assemblies which are to be stored. As will become apparent, bracket 35 holds sensor assembly 25 in the predetermined position shown in FIG. 1 in which the sensor assembly battery is automatically recharged. For this purpose, bracket 35 is designed so that when sensor assembly 25 is placed in the storage position shown in FIG. 1, it is automatically connected to the power source in console 13 for recharging of the battery.

Figure 3:
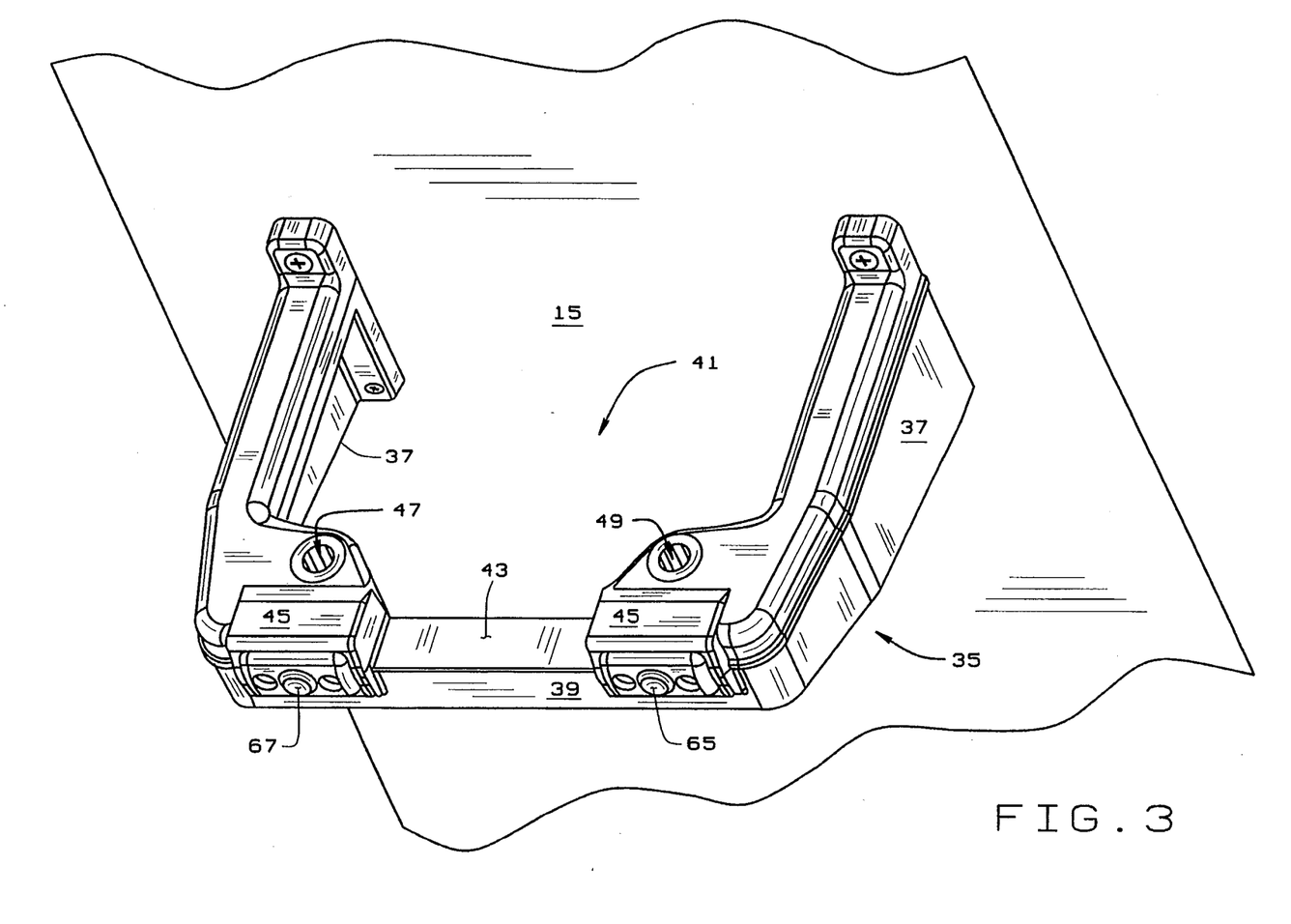
FIG. 3 is a perspective view of a storage station for a wheel alignment sensor assembly used with the present invention.
Figure 3A:
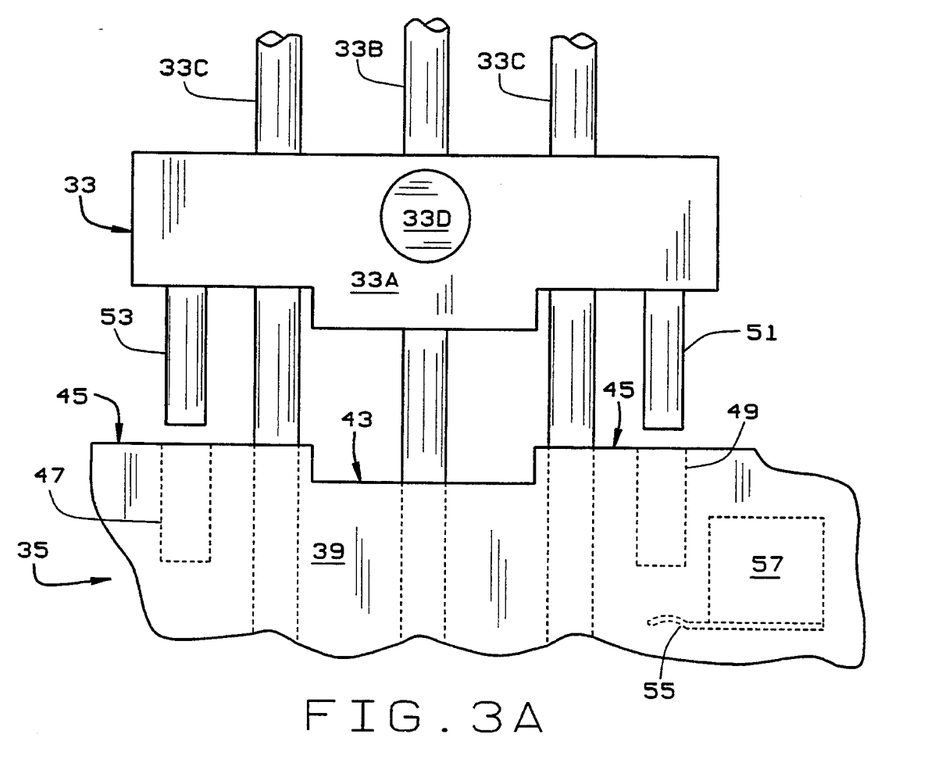
FIG. 3A is a front elevation illustrating the interrelationship of the storage station of FIG. 3 with the wheel alignment sensor assembly.

Bracket 35 is shown in more detail in FIGS. 3 and 3A. The bracket is basically U-shaped with a pair of arms 37 which extend outwardly from console stand 15 and terminate in a bracket base 39. The bracket defines an open space 41 in which adapter 33 may be disposed. Bracket base 39 includes a lowered central portion 43 flanked by a pair of shoulders 45 designed to receive a cross member 33A of adapter 33 (FIG. 3A). Adapter 33 includes a central rod 33B and two track rods 33C which are secured to cross member 33A, as well as a suitable securing member 33D for removably securing sensor assembly housing 25B to the adapter. It should be appreciated that the particular structure of securing the sensor housing to the adapter forms no part of the present invention.

The shape of the bottom of the adapter cross member corresponds to that defined by lowered central portion 43 and shoulders 45 of bracket 35 so that the bracket accepts and holds the adapter. Bracket base 39 also includes a pair of bores 47, 49 for accepting corresponding positioning rods 51, 53 of the adapter cross member. As the adapter is moved downwardly from the position shown in FIG. 3A, the positioning rods 51, 53 are accepted in bores 49, 47, while central rod 33B and track rods 33C pass through the opening 41 between the bracket and the console. It should be appreciated that normally sensor assembly housing 25B is secured to adapter 33 as the entire sensor assembly 25 is lowered into place at the storage station. It is not shown in FIG. 3A only for purposes of clarity of illustration.

Figure 3B:
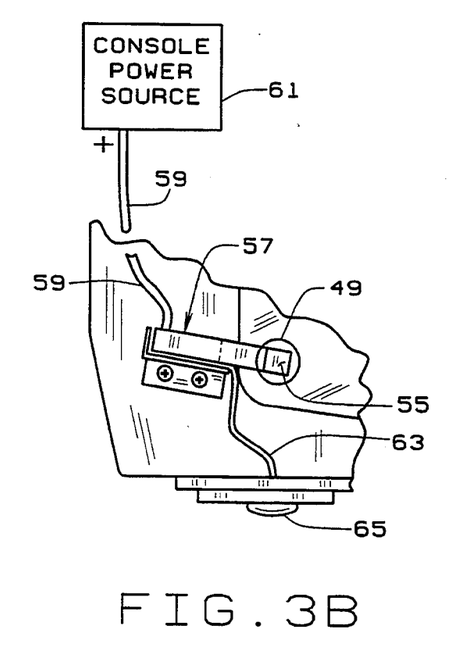
FIG. 3B is a bottom plan of a portion of the storage station of FIG. 3.

Positioning rods 51 and 53 in combination with corresponding bores 47 and 49 serve to removably secure the sensor assembly to the console, but more importantly they accurately position the sensor assembly 25 in a predetermined position with respect to the bracket 35. In addition, as rod 51 moves downwardly along bore 49 it strikes the actuator 55 of a switch 57. Switch 57 (see FIG. 3B) is electrically connected by a first wire 59 to the positive side of the console power source 61 and by a second wire 63 to a positive power terminal 65 disposed at the front of bracket 35. A second, negative power terminal 67 is also disposed at the front of bracket 35, on the opposite side lowered central portion 43 of the bracket. The act of rod 51 striking actuator 55 automatically closes the circuit between power source 61 and bracket power terminal 65 to make power available at terminals 65, 67.

Figures 4, 5:
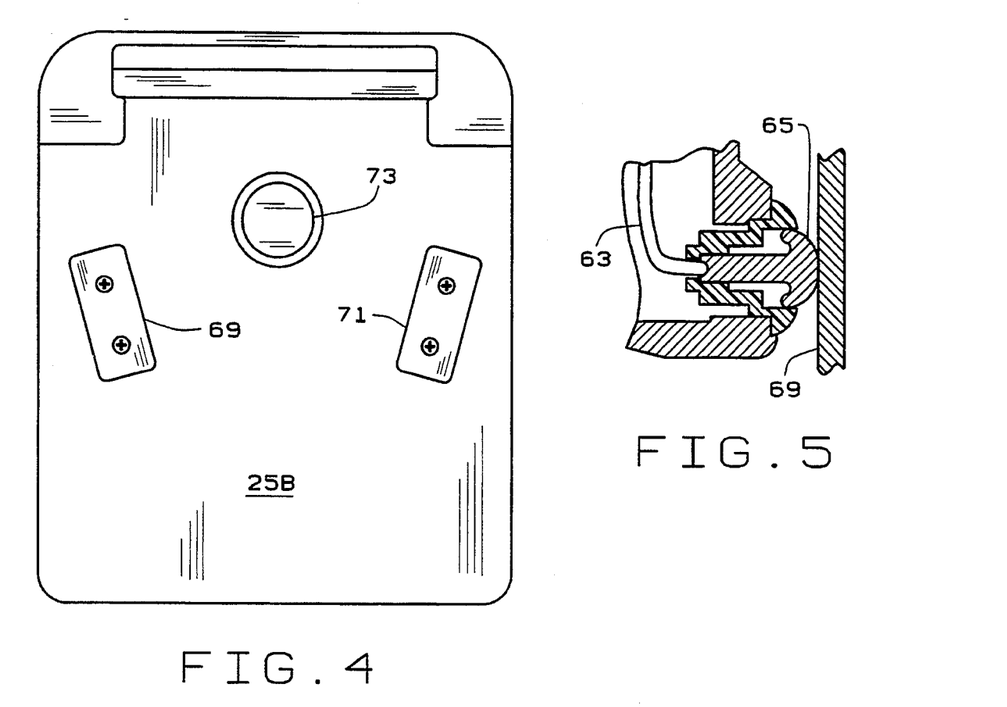
FIG. 4 is an elevation of the rear of a housing of the wheel alignment sensor assembly.
FIG. 5 is a sectional view illustrating electrical connection between the terminals of the storage station of FIG. 3 and the sensor housing of FIG. 4.

Sensor assembly housing 25B includes a pair of terminals 69, 71 (FIG. 4) disposed on the rear of the housing and operatively connected to the sensor assembly battery as explained below. When the sensor assembly is placed in the predetermined position on bracket 35, terminals 69 and 71 of the sensor assembly are disposed in abutting, mating relationship with terminals 65 and 67 of the bracket to make electrical contact with the bracket power terminals 65 and 67. This provides charging power for the battery of the sensor assembly. Thus, positioning rod 51 in combination with switch 57 automatically interconnect the sensor assembly battery and the power source to charge the sensor assembly battery when the sensor assembly is disposed in the predetermined position with respect to the storage station. They also provide an interlock, since the power cannot be applied to the bracket terminals until the sensor assembly is placed in the predetermined position. FIG. 4 also shows a securing member 73 for removably securing the sensor housing to the adapter. As mentioned above, this forms no part of the present invention.

The connection made when the sensor assembly is placed on bracket 35 is shown for positive terminals 65 and 69 in FIG. 5. Power terminals 65 and 67 (as indicated in FIG. 5 for positive power terminal 65) are mechanically floating to allow for minor variations in the placement of the sensor assembly with respect to the bracket. For the same reason, sensor assembly terminals 69 and 71 are elongated and disposed as shown to accommodate insubstantial differences in sensor assembly placement.

Figure 6:
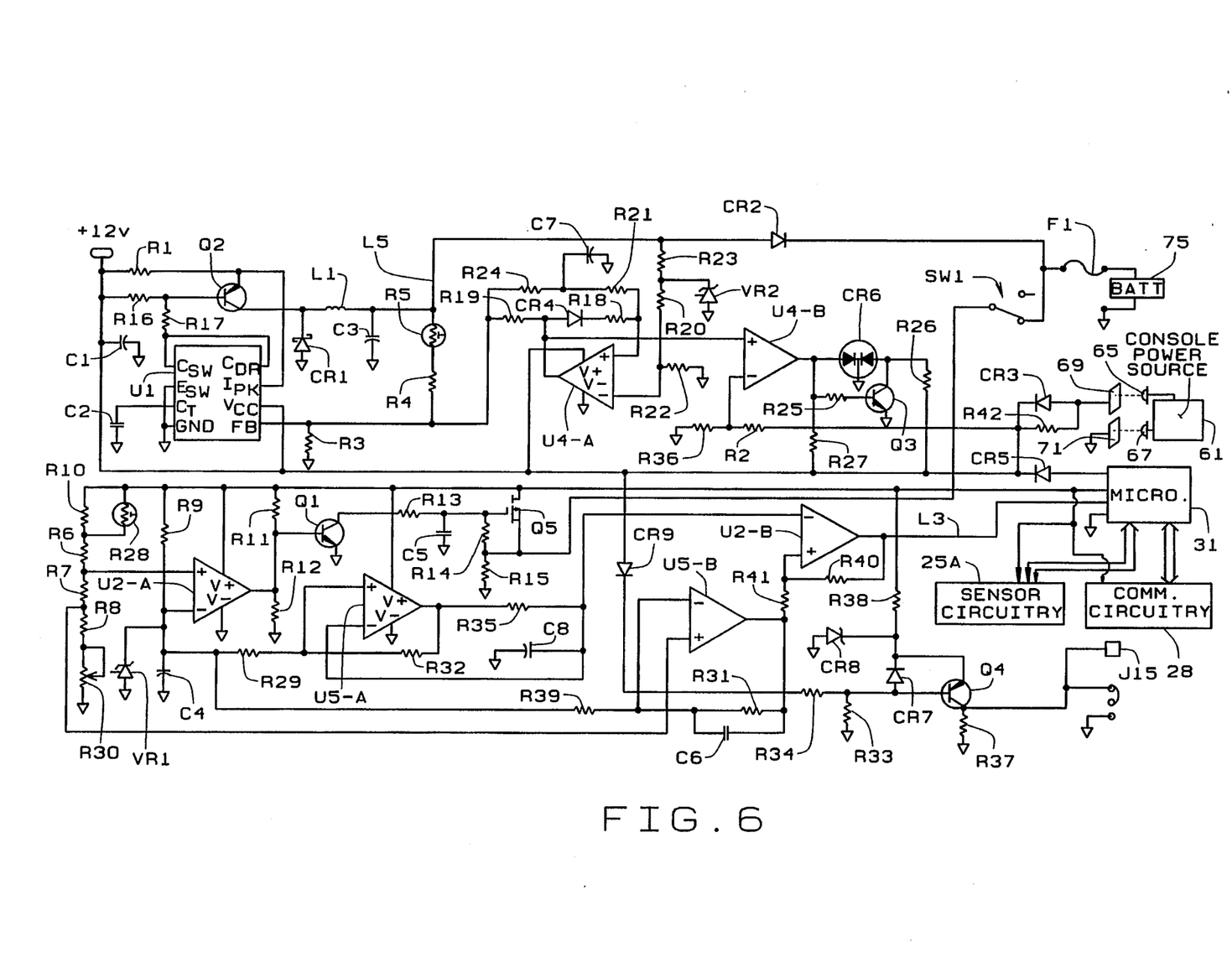
FIG. 6 is an electrical schematic of the circuitry of the wheel alignment sensor assembly.

Turning to FIG. 6, the sensor assembly battery (labelled 75) provides power for the circuitry of FIG. 6 while the sensor assembly 25 is in use. The circuitry of FIG. 6 in turn senses battery voltage and, when the sensor assembly is disposed at the storage station, regulates the charging voltage applied to the battery. In addition, the battery level is communicated by sensor assembly microcomputer 31 (by means of the communications circuitry 28) back to console microcomputer 22, where the level for the battery of each sensor assembly is displayed to the user on display 28, all as described below.

The principle behind the measurement of the state of discharge of sensor battery 75 is that the terminal voltage of a lead-acid battery (preferably, but not limited to, a sealed, starved-electrolyte battery) under known load (which may be no load) is a function of the remaining energy in the battery and temperature. It is known, for example, that for a typical six volt battery, at about 500 mA drain, a terminal voltage of at least 6.15 volts indicates that the battery is fully charged. A terminal voltage of no more than 5.9 voltages indicates that the battery only has five to ten per cent energy remaining (this is considered empty for purposes of the present invention). The terminal voltage of the sensor assembly battery, as will appear, is sampled, converted to a pulse width modulated signal, and supplied over a single digital line to sensor microcomputer 31, for further communication to console microcomputer 22.

Referring specifically to the schematic of FIG. 6, during normal use battery 75 is connected through a power switch SW1 and an MTP12P06-type transistor Q5 to supply power over a line L1 to sensor assembly microcomputer 31, the sensor circuitry 25A, and the communications circuitry 28. The voltage on line L1 is, therefore, substantially the same as the battery voltage itself. The terminal voltage as it appears on line L1 is scaled by a voltage divider composed of resistors R10, R28, R6, R7, R8, and R30. Resistors R10 and R28 are in parallel with each other, resistor R28 being a thermistor and providing temperature compensation. Resistors R6, R7, R8 and R30 are in series. The scaled terminal voltage is taken at the junction between resistors R7 and R8 and supplied to the positive input of an amplifier U5-B whose amplification factor is determined by resistors R31 and R39 in its feedback circuit. One end of resistor R39 is connected to the negative input of amplifier U5-B, while the other is connected to a voltage reference Zener diode VR1. The output of amplifier U5-B, therefore, represents the scaled battery terminal voltage.

The scaled battery terminal voltage output of amplifier U5-B is supplied through a resistor R41 to the positive input of a comparator U2-B. The other input of the comparator is a sawtooth reference voltage generated as follows: Chip U5-A is configured as a free running oscillator with a ten second cycle time. (The period of oscillator U5-A is arbitrary, but is selected to be relatively slow to give microcomputer 31 more than adequate time to sample the data at a fairly low rate.) The frequency of the oscillator is determined by a resistor R35 and a capacitor C8 connected to its negative feedback loop. The sawtooth output of oscillator U5-A is centered about the reference voltage set by diode VR1, said diode being connected to the positive input of oscillator U5-A through a resistor R29. The peak-to-peak value of the sawtooth oscillation is determined by resistor R29 and a resistor R32, connected in the positive feedback loop of the oscillator. The peak-to-peak value of the sawtooth oscillation, in combination with the scaling factor of the terminal voltage as determined by the voltage divider and the amplification of amplifier U5-B, discussed above, determine the "Full" and "Empty" points for the battery.

Comparator U2-B compares the sawtooth reference from oscillator U5-A to the battery terminal voltage, as scaled by the divider and amplifier U5-B. So long as the scaled battery terminal voltage exceeds the most-positive peak of the output of the sawtooth reference, the output of comparator U2-B remains high, reflecting the fact that the battery is fully charged (has a terminal voltage of at least 6.15 volts). As the battery is discharged, its terminal voltage lowers. At the point that the sawtooth reference voltage exceeds the scaled battery terminal voltage, the output of comparator U2-B goes low, and remains low until the sawtooth reference goes lower than the scaled battery voltage. As a result, (as the sawtooth continues) a pulse is produced at the output of comparator U2-B each cycle. The percent of the cycle that the pulse is High is a function of the scaled battery terminal voltage, and hence the remaining energy in the battery. When the scaled battery terminal voltage is always lower than the lowest excursion of the sawtooth, comparator U2-B's output remains low 100% of the time, which represents the "Empty" state of the battery. The voltage divider which supplies the terminal voltage to amplifier U5-B is set such that the terminal voltage at the 50% energy level (about 6.07) produces a 50% duty cycle in the output of comparator U2-B.

Thus, by continually comparing the scaled terminal voltage with the sawtooth reference, comparator U2-B generates a waveform whose duty cycle reflects the battery terminal voltage and, in turn, the battery energy level. This waveform is digital and is supplied on a single digital line L3 to microcomputer 31. The sensor assembly microcomputer reads line L3 at a reasonable rate (e.g., 1 Hz), and calculates the battery charge status as follows:

% remaining charge=(High time/(High time+Low time))* 100. Microcomputer 31 sends this information via the communications circuitry 28 to console microcomputer 22, where it is displayed on display 21, as described below in connection with FIG. 7.

In addition to the battery level sensing circuitry described above, the circuitry of FIG. 6 includes a comparator U2-A having its negative input connected to reference diode VR1 and its positive input connected to the voltage divider at the junction between resistors R6 and R7. If the battery terminal voltage is less than about 5.5 volts (that is, always less than the desired "empty" level), the output of comparator U2-A is supplied by means of a transistor Q1 to turn off transistor Q5. This disconnects the battery from the load, which prevents excessively deep discharge and protects the equipment. The only load to the battery 75 in this disconnected mode is a 100K resistor R15, and miniscule FET leakage.

The top portion of the circuitry of FIG. 6 is a battery charging circuit for battery 75. This circuit includes a switcher U1 (an MC34063A-type chip) for providing controlled charge current to battery 75 over a line L5. The switcher is controlled by a comparator U4-A which ensures full charge of battery 75 as quickly as possible. The negative input of comparator U4-A is connected to a voltage divider made up of three resistors R22, R20 and R23. One end of the divider is connected to line L5, so that the voltages measured along the divider are scaled versions of the battery charging voltage. The junction between resistors R20 and R23 is connected to a Zener diode VR2 which provides a reference for the comparator controlled charging voltage. The charging circuit is configured so that when the console power terminals 65 and 67 are in contact with sensor assembly terminals 69 and 71, full current is allowed to pass to the battery for charging until the charging voltage reaches about 8.3 volts (for a six-volt battery). At that point, comparator U4-A switches, which lowers the voltage roof for the charging voltage to about 7.35 volts. This puts the charging circuit into a trickle mode. It would, of course, be possible (and simpler) to charge the battery to the 7.35 level only, but that results in the battery only reaching about 90% of full charge each time. Eventually under that approach, the battery sulfates and is destroyed.

In addition to controlling switcher U1, the output of comparator U4-A is supplied to a comparator U4-B whose output causes a light-emitting diode indicator CR6 to switch between the color red (representing high current charging) and the color green (representing trickle charging). The indicator is disposed in such a location that it is visible to the technician/user.

Figure 7:
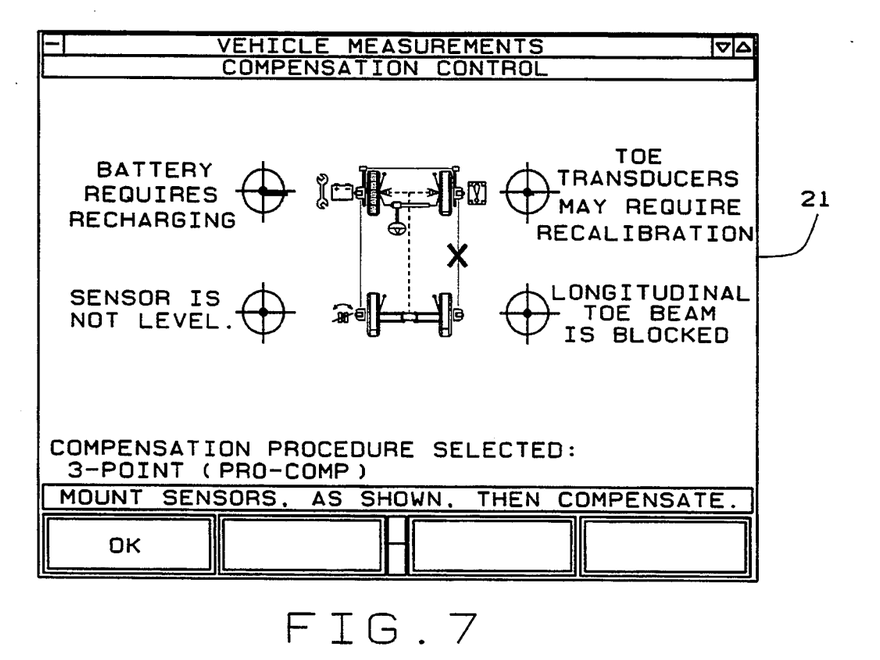
FIG. 7 is a front elevation of a display of the present invention indicative of battery levels in the various sensor assemblies used in a four wheel system.

Turning to FIG. 7, display 21 of system 11 is shown to include various indicia representing information concerning the alignment process, including a schematic depiction of the wheels of a vehicle and the sensors disposed thereon. Although battery charge level can be depicted on display 21 at any desired position, one preferred display uses the depiction of the wheels to readily illustrate the battery levels for the individual batteries of each sensor assembly. The battery charge level received from each sensor microcomputer 31 is used by microcomputer 22 at the console to change the depiction of the wheel corresponding to that particular battery.

When the battery is fully charged, the interior of the tire is shown entirely in green. As the battery discharges, the green level in the corresponding wheel decreases. For example, in FIG. 7, it can be seen that the battery charge levels for the sensor assemblies associated with the rear two tires are higher than the battery charge level for the sensor assembly for the right front tire. When the battery charge level falls to the "empty" level defined above, the interior of the corresponding wheel turns to red, and a corresponding message is displayed "Battery requires recharging." This is shown for the left front wheel in FIG. 7. These displays give the technician/user an immediate awareness of the actual battery status for all four sensor assemblies, without taking up unnecessary space on display 21.

From the above it will be understood that the various objects and features of the present invention are achieved and other advantageous results obtained. The foregoing description has been set forth for illustrative purposes only. Variations, within the scope of the appended claims, may be apparent to those skilled in the art.

What is claimed is:

1. A vehicle wheel alignment system comprising:
    a wheel alignment sensor assembly adapted to be removably secured to a vehicle wheel to measure alignment angles thereof, said sensor assembly including a battery to provide power during measurement of said alignment angles, said sensor assembly further including a sensor housing and an adapter for securing the sensor housing to a vehicle wheel, said sensor housing being removably secured to said adapter;
    a storage station for said sensor assembly, said storage station including means for holding said sensor assembly in a predetermined position with respect to the storage station, said storage station including a power source for charging the sensor assembly battery, said means for holding the sensor assembly in a predetermined position including means disposed on the storage station for accepting and holding in place the sensor assembly adapter while the sensor housing is secured to the adapter;
    means for automatically interconnecting the sensor assembly battery and the power source to charge the sensor assembly battery when the sensor assembly is disposed in the predetermined position with respect to the storage station.

2. The vehicle wheel alignment system as set forth in claim 1 wherein the sensor assembly has at least a pair of terminals operatively connected to the battery and the storage station has at least a pair of terminals operatively connected to the power source, said respective pairs of terminals being disposed in abutting mating relationship when the sensor assembly is disposed in the predetermined position with respect to the storage station.

3. The vehicle wheel alignment system as set forth in claim 2 including means for connecting the storage station terminals to the power source when the sensor assembly is disposed in the predetermined position.

4. The vehicle wheel alignment system as set forth in claim 3 wherein said connecting means includes switch means disposed between the power source and the storage station terminals, said switch means being actuated by placement of the sensor assembly in the predetermined position to apply power to the storage station terminals.

5. The vehicle wheel alignment system as set forth in claim 2 wherein at least one pair of terminals is generally elongate to accommodate relatively insubstantial variations in the position of the sensor assembly with respect to the storage station.

6. The vehicle wheel alignment system as set forth in claim 2 wherein at least one pair of terminals is mechanically floating.

7. The vehicle wheel alignment system as set forth in claim 1 further including means for sensing the state of discharge of the battery.

8. The vehicle wheel alignment system as set forth in claim 1 further including circuitry disposed between the storage station terminals and the battery for controlling the charging voltage applied to the battery.

9. The vehicle wheel alignment system as set forth in claim 8 wherein said circuitry includes means for applying a relatively high charging voltage to the battery until the battery voltage reaches a predetermined level and then applying a lower charging voltage to the battery after the predetermined level is reached.

10. A vehicle wheel alignment system comprising:
a wheel alignment sensor assembly adapted to be removably secured to a vehicle wheel to measure alignment angles thereof, said sensor assembly including a battery to provide power during measurement of said alignment angles, said sensor assembly further including a sensor housing and an adapter for securing the sensor housing to a vehicle wheel, said sensor housing being removably secured to said adapter;
a storage station for said sensor assembly, said storage station including means for holding said sensor assembly in a predetermined position with respect to the storage station, said storage station including a power source for charging the sensor assembly battery, said means for holding the sensor assembly in a predetermined position including means disposed on the storage station for accepting and holding in place the sensor assembly adapter while the sensor housing is secured to the adapter;
an interlock for preventing the application of power to the power source terminals until the sensor assembly is disposed in the predetermined position.

11. The vehicle wheel alignment system as set forth in claim 10 wherein the sensor assembly has at least a pair of terminals operatively connected to the battery, said respective pairs of sensor assembly and power source terminals being disposed in abutting mating relationship when the sensor assembly is disposed in the predetermined position with respect to the storage station.

12. The vehicle wheel alignment system as set forth in claim 11 wherein said interlock includes switch means disposed between the power source and the storage station terminals, said switch means being actuated by placement of the sensor assembly in the predetermined position to apply power to the storage station terminals.

13. The vehicle wheel alignment system as set forth in claim 11 wherein at least one pair of terminals is generally elongate to accommodate relatively insubstantial variations in the position of the sensor assembly with respect to the storage station.

14. The vehicle wheel alignment system as set forth in claim 11 wherein at least one pair of terminals is mechanically floating.

15. A vehicle wheel alignment system comprising:
a wheel alignment sensor assembly adapted to be removably secured to a vehicle wheel to measure alignment angles thereof, said sensor assembly including a battery to provide power during measurement of said alignment angles;
a display operatively connected to the wheel alignment sensor assembly for displaying measured alignment information;
battery level measuring means for measuring the level of discharge of the sensor assembly battery and for generating a signal proportional to the measured battery level;
means responsive to the battery level measuring means for controlling the display to display indicia thereon indicative of the level of discharge of the sensor assembly battery.

16. The vehicle wheel alignment system as set forth in claim 15 wherein the battery level measuring means includes a circuit for measuring the battery voltage, said battery voltage being indicative of the level of discharge of the sensor assembly battery.

17. The vehicle wheel alignment system as set forth in claim 15 wherein the display is operatively connected to the battery level measuring means by a digital circuit, said digital circuit being connected to the battery level measuring means by a digital line, said battery level measuring means including means for sending data representative of the level of the battery over the digital line to the digital circuit.

18. The vehicle wheel alignment system as set forth in claim 17 wherein the sending means includes means for converting the measured battery level to a pulse width modulated signal for transmission over the digital line.

19. The vehicle wheel alignment system as set forth in claim 18 wherein the duty cycle of the pulse width modulated signal is indicative of the measured battery level.

20. The vehicle wheel alignment system as set forth in claim 15 wherein the battery level measuring means is disposed in the sensor assembly and the display for displaying indicia indicative of the level of discharge of the battery is disposed at a location remote from the sensor assembly.

21. The vehicle wheel alignment system as set forth in claim 15 wherein the indicia indicative of battery level are displayed on the display in conjunction with indicia which are independent of battery level.

22. The vehicle wheel alignment system as set forth in claim 15 wherein the indicia indicative of battery level includes an analog representation of the measured battery level.

23. A vehicle wheel alignment system comprising:
a wheel alignment sensor assembly adapted to be removably secured to a vehicle wheel to measure alignment angles thereof, said sensor assembly including a battery to provide power during measurement of said alignment angles;
battery level measuring means for measuring the level of discharge of the sensor assembly battery and for providing a signal proportional to the measured battery level.

24. The vehicle wheel alignment system as set forth in claim 23 wherein the battery level measuring means includes a circuit for measuring the battery voltage, said battery voltage being indicative of the level of discharge of the sensor assembly battery.

25. The vehicle wheel alignment system as set forth in claim 23 further including a digital line connected between the battery level measuring means and a digital circuit, said signal indicative of said level of discharge being a digital signal.

26. The vehicle wheel alignment system as set forth in claim 25 including means for converting the measured battery level to a pulse width modulated signal for transmission over the digital line.

27. The vehicle wheel alignment system as set forth in claim 26 wherein the duty cycle of the pulse width modulated signal is indicative of the measured battery level.

* * * * *